United States Patent
Lu et al.

(10) Patent No.: US 11,994,448 B2
(45) Date of Patent: May 28, 2024

(54) LEAKAGE OIL DETECTION DEVICE AND LEAKAGE OIL DETECTION METHOD

(71) Applicant: Hitachi, Ltd., Tokyo (JP)

(72) Inventors: Li Lu, Tokyo (JP); Satoshi Ichimura, Tokyo (JP); Akira Nishimizu, Tokyo (JP); Akira Yamagishi, Tokyo (JP)

(73) Assignee: HITACHI, LTD., Tokyo (JP)

(*) Notice: Subject to any disclaimer, the term of this patent is extended or adjusted under 35 U.S.C. 154(b) by 435 days.

(21) Appl. No.: 17/428,123

(22) PCT Filed: Nov. 7, 2019

(86) PCT No.: PCT/JP2019/043729
§ 371 (c)(1),
(2) Date: Aug. 3, 2021

(87) PCT Pub. No.: WO2020/166148
PCT Pub. Date: Aug. 20, 2020

(65) Prior Publication Data
US 2022/0057291 A1 Feb. 24, 2022

(30) Foreign Application Priority Data
Feb. 14, 2019 (JP) .................. 2019-024380

(51) Int. Cl.
*G01M 3/38* (2006.01)
*G06T 7/00* (2017.01)

(52) U.S. Cl.
CPC .......... *G01M 3/38* (2013.01); *G06T 7/0008* (2013.01); *G06T 2207/20081* (2013.01)

(58) Field of Classification Search
CPC ............ G01M 3/38; G06T 7/0008; G06T 2207/20081
See application file for complete search history.

(56) References Cited

U.S. PATENT DOCUMENTS

| | | | | |
|---|---|---|---|---|
| 5,974,860 A | * | 11/1999 | Kuroda | G01M 3/38 73/40 |
| 2007/0084269 A1 | * | 4/2007 | Quest | G01M 3/04 252/301.16 |

(Continued)

FOREIGN PATENT DOCUMENTS

| JP | S62-32336 A | 2/1987 |
|---|---|---|
| JP | S63-6432 A | 1/1988 |

(Continued)

OTHER PUBLICATIONS

International Search Report, dated Jan. 28, 2020, for International Application No. PCT/JP2019/043729.

*Primary Examiner* — Eric S. McCall
(74) *Attorney, Agent, or Firm* — Baker Botts L.L.P.

(57) ABSTRACT

The present invention is directed to a leakage oil detection device for detecting leakage oil in an oil filled apparatus including: a light source configured to irradiate the apparatus; an imaging device configured to capture an image of the apparatus; a control device configured to control operations of the light source and the imaging device; a storage device configured to store a captured image; an image processing device configured to process the stored image; and a display device configured to display a processing result. The light source and the imaging device are arranged to capture specular reflection light from a surface of the apparatus as a target object. The image processing device recognizes a brightest portion and an adjacent dark portion on the image as leakage oil adhesion portions when a three-layer structure of luminance having bright portions having different luminances and a dark portion is observed in the image.

5 Claims, 7 Drawing Sheets

(56) References Cited

U.S. PATENT DOCUMENTS

| | | | |
|---|---|---|---|
| 2016/0275699 A1* | 9/2016 | Lu | G06T 7/90 |
| 2017/0016796 A1* | 1/2017 | Lu | H04N 23/10 |
| 2017/0234762 A1* | 8/2017 | Lu | G01M 3/38 |
| | | | 250/459.1 |
| 2021/0192710 A1* | 6/2021 | Lu | G01C 3/02 |

FOREIGN PATENT DOCUMENTS

| | | |
|---|---|---|
| JP | H08-128916 A | 5/1996 |
| JP | 2013-101028 A | 5/2013 |
| JP | 5351081 B2 | 11/2013 |
| JP | 2016-090560 A | 5/2016 |
| JP | 2017-116259 A | 6/2017 |

\* cited by examiner

[FIG. 1]
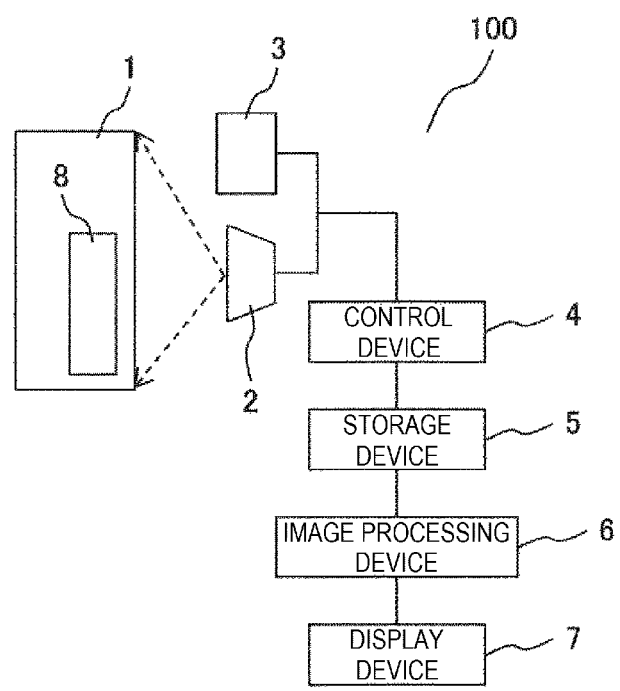

[FIG. 2]
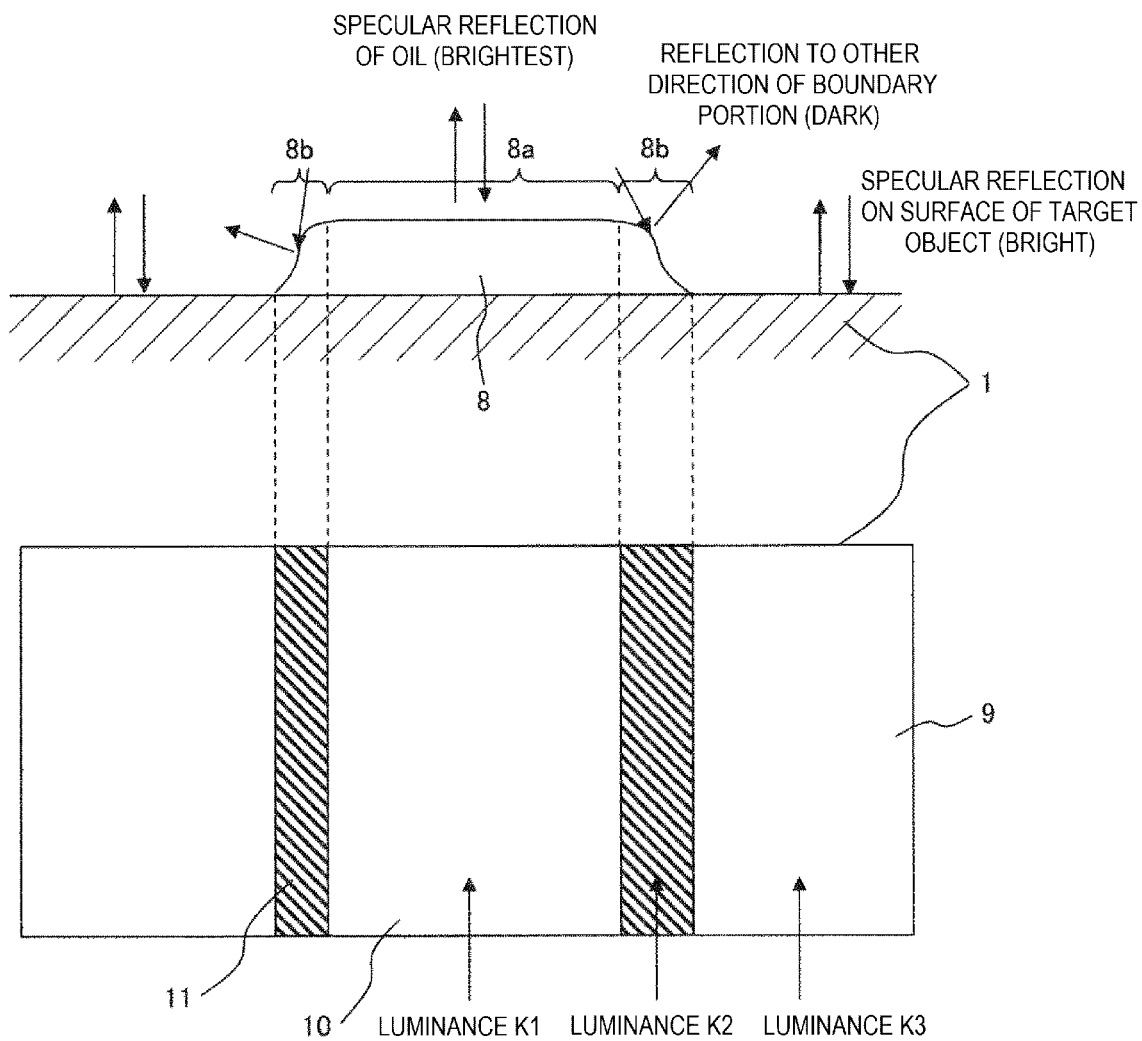

[FIG. 3]
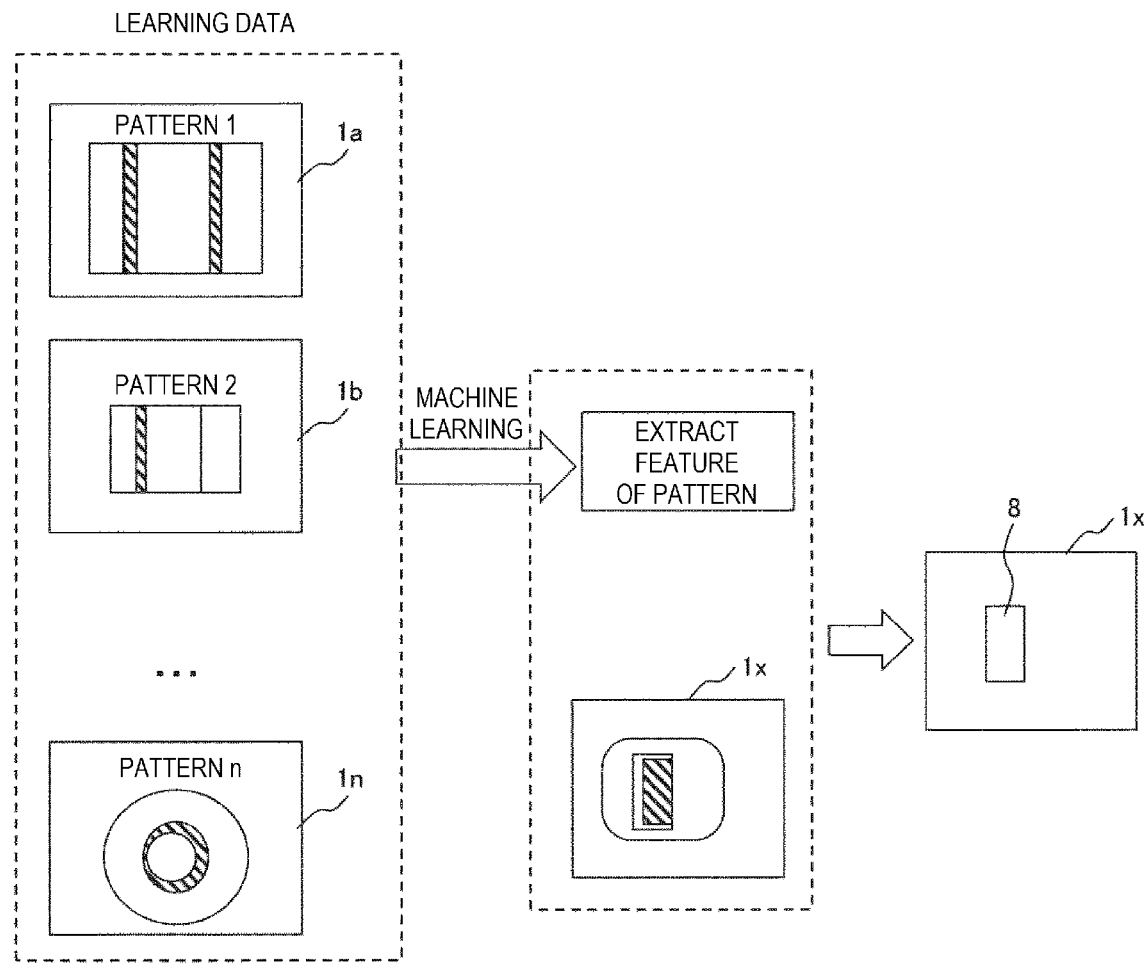

[FIG. 4]
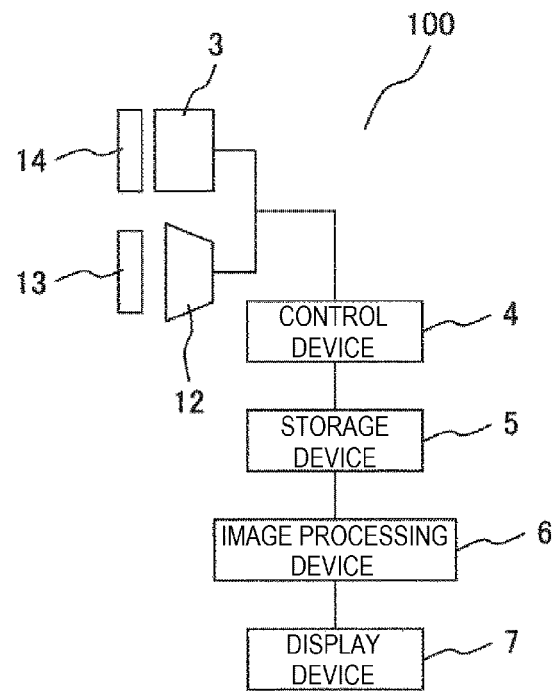
[FIG. 5]
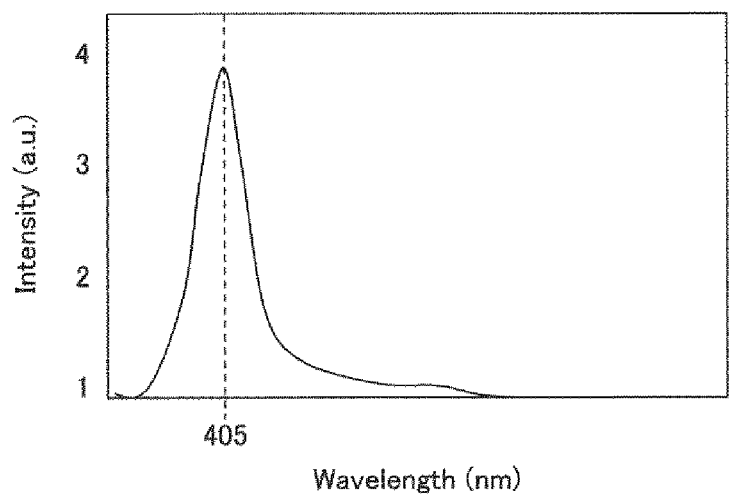

[FIG. 6]
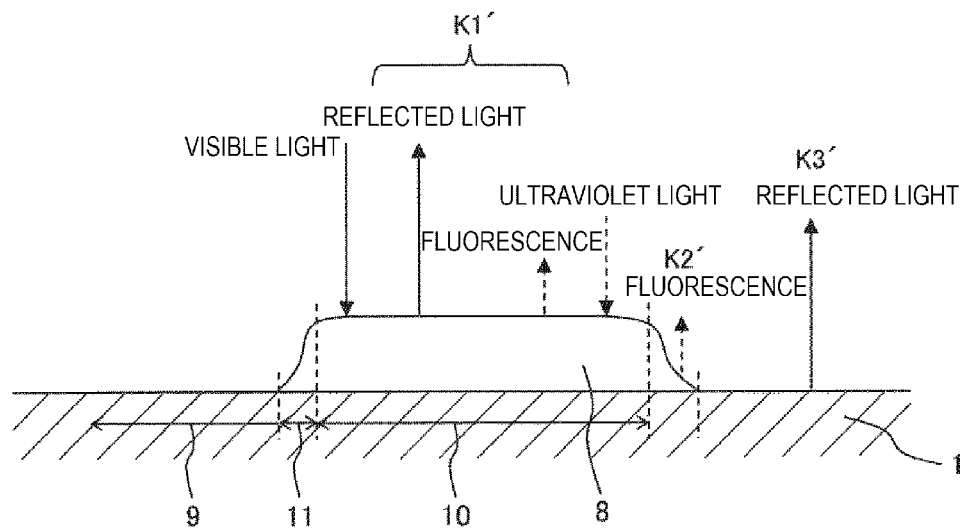
[FIG. 7]
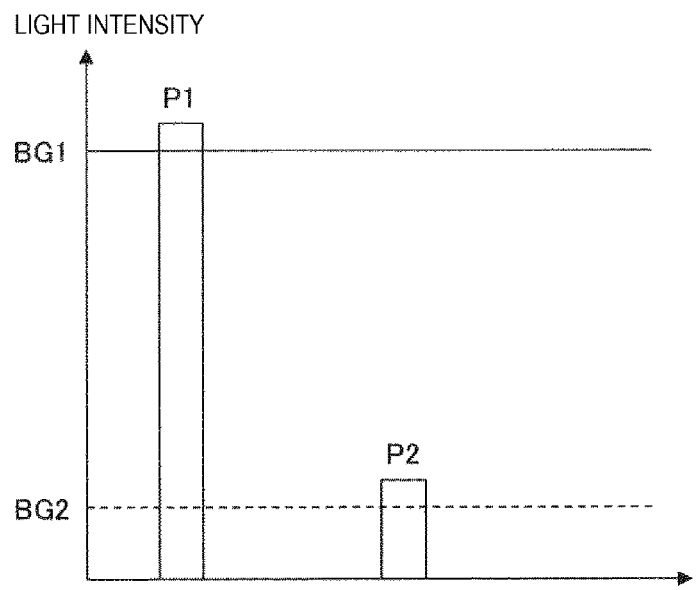

[FIG. 8]
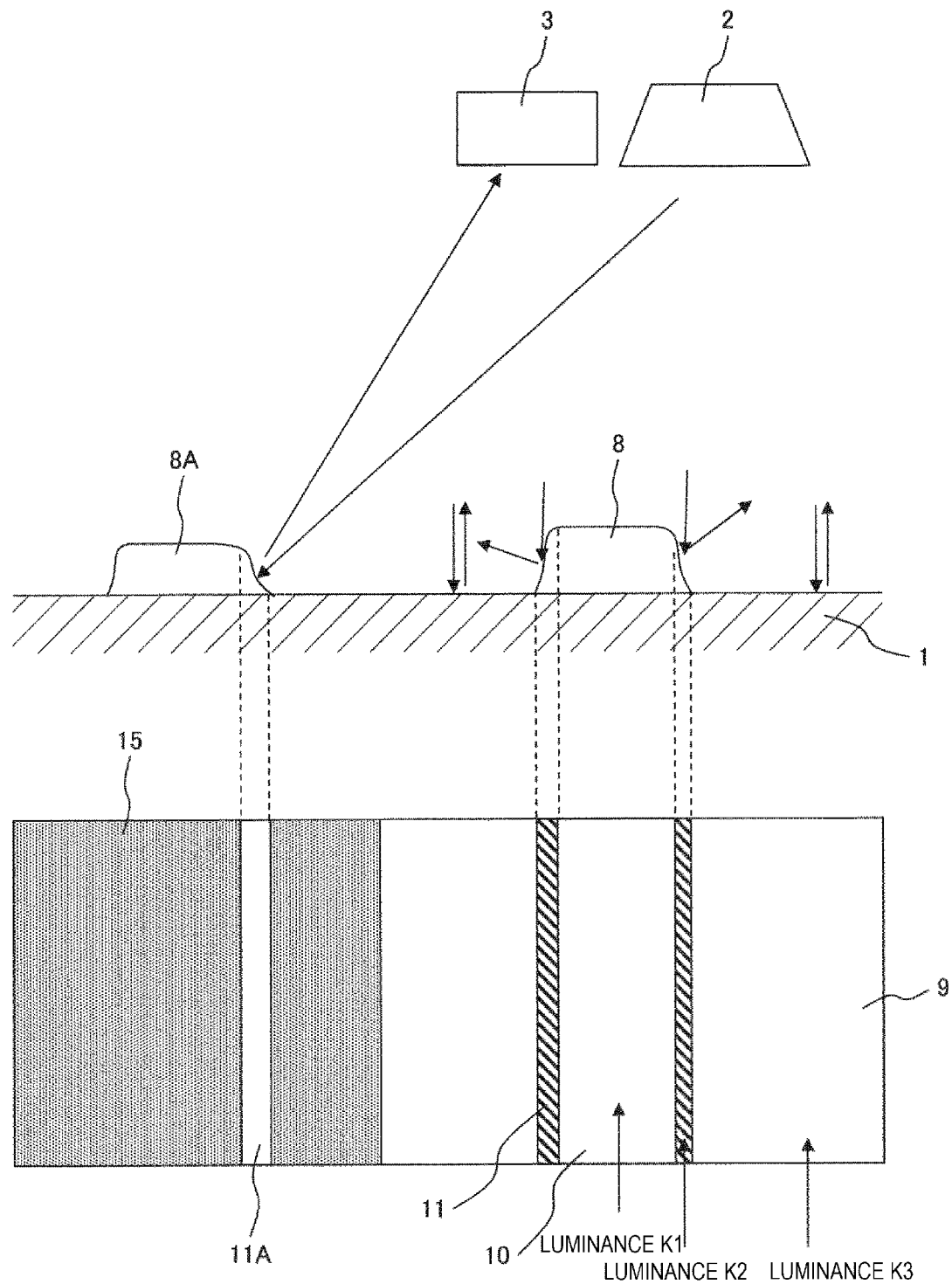

[FIG. 9]
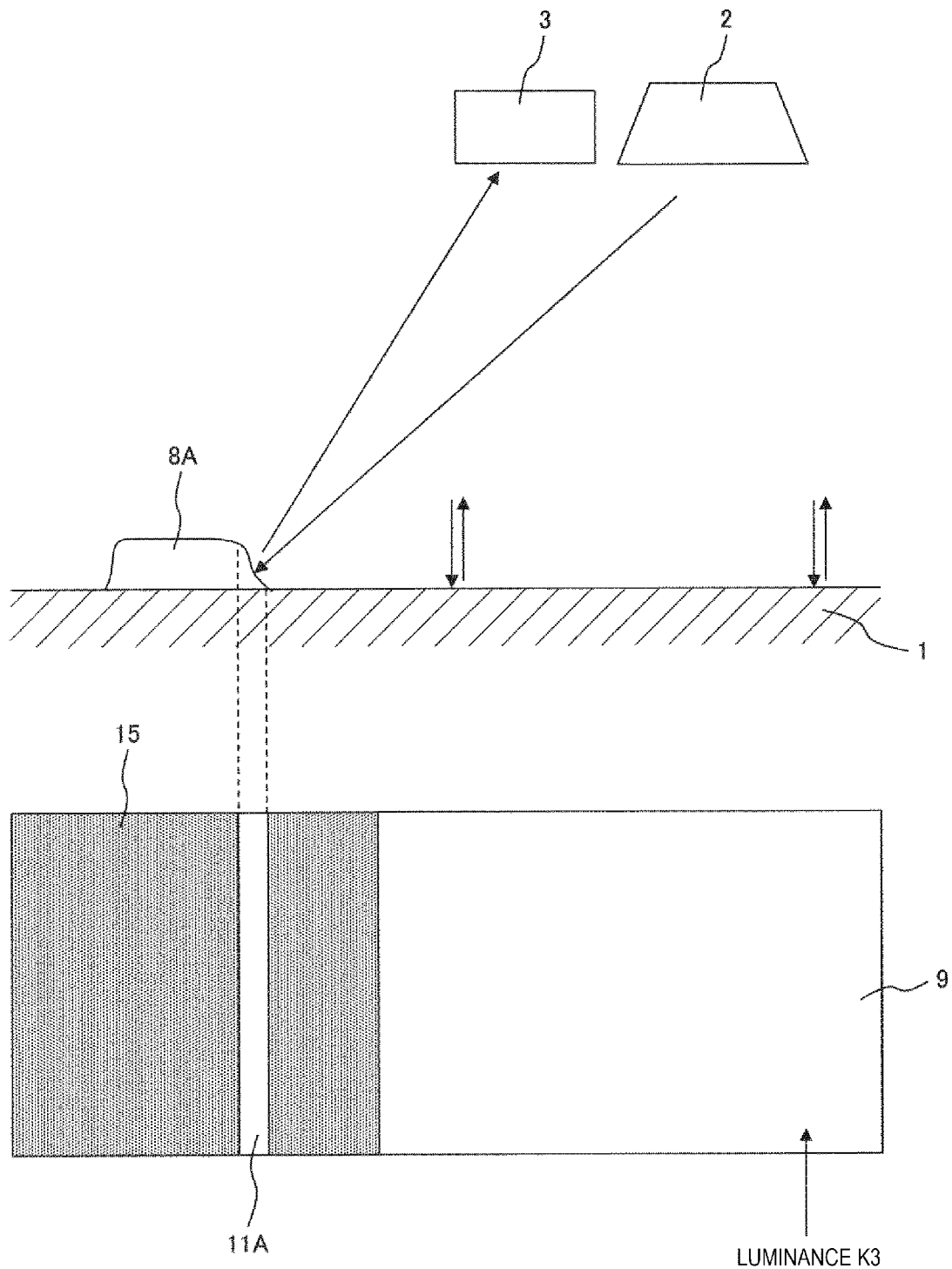

LEAKAGE OIL DETECTION DEVICE AND LEAKAGE OIL DETECTION METHOD

TECHNICAL FIELD

The present invention relates to a leakage oil detection device and a leakage oil detection method, and particularly to a leakage oil detection device and a leakage oil detection method suitable for leakage oil detection of an oil filled apparatus such as a transformer, a condenser, a hydraulic operation device of a gas insulated switchgear (GIS), a rectifier, a converter, and an inverter.

BACKGROUND ART

In related arts, in an oil storage tank or an oil filled apparatus such as a transformer, there has been a concern that oil leakage may occur due to deterioration, an accident, or the like. Since leakage oil may lead to environmental pollution or a disaster, there has been a demand for a technique for detecting leakage oil in an initial stage simply and with high accuracy.

As a technique in a related art for solving the problem, there is a technique described in PTL 1. PTL 1 describes a technique of detecting leakage oil by detecting fluorescence reflected by the leakage oil when ultraviolet light including an absorption wavelength of the leakage oil is irradiated to an object to be measured (an inspect target object such as a transformer), and more specifically, calculating the brightness and saturation of each pixel of a captured image by performing image processing on the pixels during ultraviolet light irradiation, creating a brightness-saturation graph and a brightness-saturation characteristic curve, and recognizing pixels deviated from the brightness-saturation characteristic curve by a predetermined value or more as a fluorescent spot, that is, a leakage oil spot.

CITATION LIST

Patent Literature

PTL 1: JP-A-2016-90560

SUMMARY OF INVENTION

Technical Problem

Although the technique described in PTL 1 is effective for detecting leakage oil in a period of time in which an illuminance is low, such as at night, when background noise due to daytime sunlight is large, a detection accuracy of the leakage oil decreases.

The present invention has been made in view of the above facts, and an object of the present invention is to provide a leakage oil detection device and a leakage oil detection method capable of accurately detecting leakage oil when a background noise due to daytime sunlight is large.

Solution to Problem

From the above, the present invention relates to "a leakage oil detection device configured to detect leakage oil in an oil filled apparatus, the leakage oil detection device including: a light source configured to irradiate the oil filled apparatus with light; an imaging device configured to capture an image of the oil filled apparatus; a control device configured to control operations of the light source and the imaging device; a storage device configured to store a captured image; an image processing device configured to process the stored image; and a display device configured to display a processing result, in which the light source and the imaging device are arranged in a manner of being capable of capturing specular reflection light from a surface of the oil filled apparatus as a target object, and the image processing device recognizes a brightest portion and a dark portion adjacent to the brightest portion on the captured image as leakage oil adhesion portions when a three-layer structure of luminance having bright portions having different luminances and a dark portion is observed in the image."

Further, the present invention relates to "a leakage oil detection device configured to detect leakage oil in an oil filled apparatus, the leakage oil detection device including: a light source configured to irradiate the oil filled apparatus with light; an imaging device configured to capture an image of the oil filled apparatus; a control device configured to control operations of the light source and the imaging device; a storage device configured to store a captured image; an image processing device configured to process the stored image; and a display device configured to display a processing result, in which the light source and the imaging device are arranged in a manner of being capable of capturing specular reflection light from a surface of the oil filled apparatus as a target object, and the image processing device recognizes a bright portion in luminance as a leakage oil adhesion portion when the bright portion is observed inside a dark portion of the captured image at an end portion of the image."

Further, the present invention relates to "a leakage oil detection method for detecting leakage oil of an oil filled apparatus by using an image obtained by irradiating the oil filled apparatus with light and capturing an image of the oil filled apparatus, the leakage oil detection method including: recognizing a brightest portion and a dark portion adjacent to the brightest portion on the captured image as leakage oil adhesion portions when a three-layer structure of luminance having bright portions having different luminances and a dark portion is observed in the image."

Further, the present invention relates to "a leakage oil detection method for detecting leakage oil of an oil filled apparatus by using an image obtained by irradiating the oil filled apparatus with light and capturing an image of the oil filled apparatus, the leakage oil detection method including: recognizing a bright portion in luminance as a leakage oil adhesion portion when the bright portion is observed inside a dark portion of the captured image at an end portion of the image."

Advantageous Effect

According to the present invention, leakage oil can be accurately detected when a background noise due to daytime sunlight is large.

BRIEF DESCRIPTION OF DRAWINGS

FIG. 1 is a diagram showing a schematic configuration example of a leakage oil detection device 100 according to a first embodiment.

FIG. 2 is a diagram for explaining a concept of a leakage oil detection method according to the present invention.

FIG. 3 is a diagram showing the concept of extracting a leakage oil site using a machine learning method.

FIG. 4 is a diagram showing the schematic configuration example of the leakage oil detection device 100 according to the first embodiment.

FIG. 5 is a spectrum pouch diagram of oil when irradiated with ultraviolet light according to a second embodiment.

FIG. 6 is a diagram for explaining reflected light from a target object surface in the second embodiment.

FIG. 7 is a schematic view explaining reduction in light source intensity when a filter 14 according to the second embodiment is used.

FIG. 8 is a diagram for explaining a concept of a leakage oil detection method according to a third embodiment of the present invention.

FIG. 9 is a diagram for explaining a concept of a leakage oil detection method according to a fourth embodiment of the present invention.

DESCRIPTION OF EMBODIMENTS

Hereinafter, embodiments of a leakage oil detection device and a leakage oil detection method of the present invention will be described with reference to the drawings. In the embodiments, the same components are denoted by the same reference numerals.

First Embodiment

A leakage oil detection device 100 and a leakage oil detection method according to the first embodiment of the present invention for inspecting oil adhering to a surface of an oil filled apparatus will be described with reference to FIGS. 1 to 3. In the present embodiment, an oil filled transformer in a substation will be described as an example.

FIG. 1 is a diagram showing a schematic configuration example of an inspection target object 1 and a leakage oil detection device 100 according to a first embodiment. The inspection target object 1 is an oil filled apparatus such as a transformer, a capacitor, a hydraulic operation device of a gas insulated switchgear (GIS), a rectifier, an inverter, or a converter.

In the present embodiment, an oil filled transformer disposed in the substation will be described as the inspection target object 1.

As shown in FIG. 1, the leakage oil detection device 100 includes a light source 2, an imaging device 3, a control device 4 that controls the operations of the devices 2 and 3, a storage device 5 that stores captured images, an image processing device 6 that processes the stored images, and a display device 7 that displays processing results. The leakage oil detection device 100 captures an image of a leakage oil 8 adhering to a surface of the inspection target object 1, and finally displays an inspection result of the leakage oil on the display device 7.

Here, any lamp including visible light may be used as the light source 2. As the imaging device 3, a general-purpose product such as a digital camera or a monitoring camera that captures visible light can be used.

In the present invention, the light source 2, which is a visible light source, is used, and the specular reflected light of the oil is captured by the imaging device 3, and thereby minute leakage oil is detected.

FIG. 2 is a diagram for explaining a concept of a leakage oil detection method according to the present invention. Only a specular reflection portion of the target object surface is shown. An upper part of FIG. 2 shows the surface of the target object 1 to which the leakage oil 8 is attached, and a lower part of FIG. 2 shows luminances of parts in the captured image of the surface of the target object 1.

Although as shown in the upper part of FIG. 2, when the leakage oil 8 adheres to the surface of the target object 1, the outermost surface 8a of the oil is parallel to the surface of the target object 1, a boundary portion 8b between the oil and the target object surface is formed. Here, it is assumed that the light source 2 and the imaging device 3 are arranged in a manner of being capable to capture specular reflected light from the surface of the target object 1. In an example of FIG. 1, the light source 2 and the imaging device 3 are installed at positions in a direction orthogonal to the surface of the target object 1, and the reflected light from the surface of the target object 1 is imaged by the imaging device 3. Accordingly, when the oil 8 adheres to the portion of the specular reflected light, the specular reflected light from the oil 8 is also captured in the same manner.

However, at a boundary portion 8b between the oil 8 and the target object 1, reflected light is directed in another direction different from a direction toward the imaging device 3, and therefore the specular reflected light is not observed by the imaging device 3. Therefore, on the captured image, an oil surface specular reflected light portion 10 corresponding to the outermost surface 8a of the oil 8 and a target object surface specular reflected light portion 9 corresponding to the surface to which the oil is not attached are bright, but an oil surface specular reflected light portion 11 corresponding to the boundary portion 8b between the oil and the target object is dark.

When comparing the oil surface specular reflected light portion 10 and the target object surface specular reflected light portion 9, the oil surface specular reflected light portion 10 is observed as an image brighter than the target object surface specular reflected light portion 9 because a reflectance of the oil 8 with respect to visible light is higher than a reflectance of the surface of the target object 1.

That is, as shown in the lower part of FIG. 2, in the image, K1>K3>K2, where the luminance of the oil surface specularly reflected light portion 10 is K1, the luminance of the boundary portion 11 between the oil and the target object is K2, and the luminance of the target object surface specular reflected light generating portion 9 is K3.

As a result, a three-layer structure as shown in the lower part of FIG. 2 is observed in the observed image. The oil surface specular reflected portion 10 is the brightest, the adjacent boundary portion 11 between the oil and the target object is dark, and the subsequently adjacent specular reflected portion 9 of the target object surface is bright. In addition, the luminance of the oil surface specular reflection portion 10 is observed to be lower than the luminance of the specular reflected portion of the target object surface.

In this way, when an adjacent three-layer structure is observed as a portion having the luminances of K1>K3>K2, both the oil surface specular reflected portion 10 and the adjacent boundary portion 11 between the oil 8 and the target object 1 are recognized as leakage oil sites.

Further, the leakage oil site can be extracted alone by using the feature of the pattern configured by the three-layer structure and by using a machine learning method.

FIG. 3 is a diagram showing a concept of extracting a leakage oil site using the machine learning method. As shown in FIG. 3, as a machine learning method, first, shapes of various target objects 1, an irradiation shape of a light source, and a state of leakage oil are considered, a large amount of images are captured to obtain images 1a to 1n as learning data, and a leakage oil pattern is self-learned in the image processing device 6. Next, a determination image 1x is input, and the leakage oil 8 is extracted alone from the determination image 1x based on the learning result.

When the portion of the extracted leakage oil 8 is provided on an original image or the same image obtained when the light source is not irradiated by a method such as marker attachment and displayed on the display device 7, even an unskilled inspector can easily identify a leakage oil location.

It is not necessary to perform all procedures of the present embodiment, and a part of the procedures can be performed alone according to a situation of the location where the procedures are performed.

According to the leakage oil detection device of the present embodiment, when background noise due to daytime sunlight is large, leakage oil can be detected with high accuracy.

Second Embodiment

A leakage oil detection device 100 and the leakage oil detection method according to the second embodiment of the present invention for inspecting oil adhering to the surface of the oil filled apparatus will be described with reference to FIGS. 4 to 6. Repetitive descriptions of points common to the first embodiment will be omitted.

In the leakage oil detection device 100 according to the second embodiment shown in FIG. 4, light from a light source 12 includes both ultraviolet light and visible light. A filter 13 is mounted in front of the light source 12. The filter 13 transmits ultraviolet light having a center wavelength of 365 nm and a half value width of about 10 nm, and visible light having a center wavelength of 405 nm and a half value width of about 10 nm. Of course, two filters may be used. Similarly, a filter 14 is mounted in front of the imaging device 3. The filter 14 transmits the visible light having the center wavelength of 405 nm and the half value width of about 10 nm.

FIG. 5 shows a porch diagram of a spectrum obtained when a mineral oil for a transformer is irradiated with an ultraviolet light source having a peak value of 365 nm. A strongest peak was observed in the vicinity of 405 nm.

FIG. 6 is a diagram for explaining reflected light from the target object surface according to the second embodiment. As shown in FIG. 6, when the oil 8 is irradiated with ultraviolet light having a peak value of 365 nm, fluorescence from the oil is also observed in addition to the reflected light. At the time, intensity K1' of light from oil surface specular reflected portion 10=intensity of specular reflected light K1+fluorescence, intensity K2' of light from adjacent boundary portion 11 between oil and object=intensity of diffuse reflection light+fluorescence, and intensity K3' of light from subsequently adjacent specular reflected portion 9 of target object surface=intensity of specular reflection light. In this way, fluorescence is not observed in a portion to which oil is not attached. In this way, the intensity of the light at the oil surface specular reflection generating portion 10 can be further improved, and therefore a detection sensitivity can be improved.

In general, since the intensity of the fluorescence is weaker than that of the specular reflection light, the brightness of the boundary portion 11 between the oil 8 and the target object 1 is the lowest as compared with the luminance of the oil surface specular reflected portion 10 and the specular reflected portion 9 on the target object surface.

On the other hand, when the filter 14 having a center wavelength of 405 nm and a half-value width of about 10 nm is used, an intensity of ambient light can be reduced by about 90%. For example, as shown in FIG. 7, when the filter 14 is not used, an intensity P1 of the light source needs to be larger than the intensity of ambient light BG1; on the other hand, when the filter 14 is used, an intensity P2 of the light source is only required to be larger than the intensity of ambient light intensity BG2. Therefore, the required intensity of the light source can also be greatly reduced.

Of course, when a wavelength of an irradiation light source and a color of a fluorescence are different depending on a type of the oil, the present method can be applied by selecting a filter having an appropriate wavelength range.

It is not necessary to perform all procedures of the present embodiment, and a part of the procedures can be performed alone according to a situation of the location where the procedures are performed.

According to the leakage oil detection device of the present embodiment, the required intensity of the light source can be reduced, and a cost of the detection device can be reduced.

Third Embodiment

The leakage oil detection method according to the third embodiment of the present invention for inspecting oil adhering to the surface of an oil filled apparatus will be described with reference to FIG. 8. Repetitive descriptions of common points as in the first embodiment are omitted.

In the third embodiment, as shown in FIG. 8, a case is assumed in which the leakage oil 8 adheres to the specular reflected portion 9 on the target object surface and the leakage oil 8A adheres to a vicinity 15 of the specular reflected portion on the target object surface. At this time, in addition to the oil surface specular reflected portion 10, specular reflected light is observed by the imaging device 3 from a boundary portion 11A between the leakage oil 8A and the target object. The above is based on an assumption that leakage oil is present in each of a central portion and a peripheral portion of the captured image.

In such a case, a five-layer structure as shown in a lower part of FIG. 8 is observed. As a result, the vicinity 15 of the specular reflected portion on the target object surface is dark, the boundary portion 11A between the leakage oil 8A and the target object and the oil surface specular reflection generating portion 10 are the brightest, the adjacent boundary portion 11 between the oil and the target object is dark, and the subsequently adjacent specular reflected portion 9 of the target object surface is bright. In addition, the luminance of the boundary portion 11A between the leakage oil 8A and the target object and the oil surface specular reflection generating portion 10 is higher than the luminance of the specular reflected portion 9 on the target object surface.

In this case, the portion 11A observed brightly in the vicinity of the specular reflected portion on the target object surface, and the oil surface specular reflection generating portion 10 and the adjacent dark portion 11 in the specular reflected portion of the target object surface are recognized as leakage oil adhesion portions.

In this case, in addition to the three-layer structure in a central portion of the image in FIG. 2, a bright portion and a dark portion are observed in an end portion of the image, and in this case, the bright portion can be regarded as an oil leakage portion. That is, when a bright portion and a dark portion are observed at the end portion of the image, and particularly when THE bright portion is observed in the dark portion, the bright portion can be regarded as the oil leakage portion.

In some cases, the luminance of the boundary portion 11 between the oil and the target object and the luminance of the vicinity 15 of the target object surface specular reflected light generating portion are substantially equal to each other.

Further, the leakage oil site can be extracted alone in the same manner as in the first embodiment by using the feature of the pattern configured by the five-layer structure described above and by using a machine learning method.

As described above, according to the leakage oil detection device of the present embodiment, when the background noise due to the daytime sunlight is large, the leakage oil can be detected with high accuracy.

Fourth Embodiment

Next, the leakage oil detection method according to the fourth embodiment of the present invention for inspecting oil adhering to the surface of an oil filled apparatus will be described with reference to FIG. 9. Repetitive descriptions of common points as in the first embodiment and the third embodiment are omitted.

In FIG. 9, a case is assumed in which the leakage oil 8 does not adhere to the specular reflected portion 9 on the target object surface and the leakage oil 8A adheres to the vicinity 15 of the specular reflected portion on the target object surface. This is based on an assumption that there is leakage oil only in the peripheral portion of the specular reflection portion of the target object surface in the captured image. At this time, only specular reflected light is observed by the imaging device 3 from the boundary portion 11A between the leakage oil 8A and the target object.

In this way, a three-layer structure as shown in the lower part of FIG. 9 is observed. At the time, the vicinity 15 of the target object surface specular reflected light generating portion is dark, the adjacent boundary portion 11A between the leakage oil 8A and the target object is the brightest, and the adjacent specular reflection generating portion 9 of the target object surface is bright, but has a luminance lower than that of the boundary portion 11A.

Also in this case, similar as in the third embodiment, when a bright portion and a dark portion are observed at the end portion of the image, and the bright portion is observed in the dark portion, the bright portion can be set as the oil leakage portion.

Further, the leakage oil site can be extracted alone in the same manner as in the first embodiment by using the feature of the pattern configured by the three-layer structure and by using the machine learning method.

As described above, according to the leakage oil detection device of the present embodiment, when the background noise due to the daytime sunlight is large, the leakage oil can be detected with high accuracy.

Various combinations of the first to fourth embodiments are possible. A detection result is not affected. There are various changes in the pattern depending on the situation, and a basic principle is the same.

REFERENCE SIGN LIST

100: leakage oil detection device
1, 1a, 1b, 1n, 1x: inspection target object
2: light source
3: imaging device
4: control device
5: storage device
6: image processing device
7: display device
8: leakage oil
9: specular reflected portion on target object surface
10, 10a: oil surface specular reflected portion
11, 11a: boundary portion between oil and target object
12: light source
13: filter
14: filter
15: vicinity of specular reflected portion on target object surface

The invention claimed is:

1. A leakage oil detection device configured to detect leakage oil in an oil filled apparatus, the leakage oil detection device comprising:
   a light source configured to irradiate the oil filled apparatus with light;
   an imaging device configured to capture an image of the oil filled apparatus;
   a control device configured to control operations of the light source and the imaging device;
   a storage device configured to store a captured image;
   an image processing device configured to process the stored image; and
   a display device configured to display a processing result, wherein
   the light source and the imaging device are arranged in a manner of being capable of capturing specular reflection light from a surface of the oil filled apparatus as a target object,
   the image processing device
      recognizes a brightest portion and a dark portion adjacent to the brightest portion on the captured image as leakage oil adhesion portions when a three-layer structure of luminance having bright portions having different luminances and a dark portion is observed in the image, and
      extracts only a leakage oil site by machine learning method with respect to the observed three-layer structure of luminance, and
   the display device displays by adding a marker to an original image or the same image obtained without irradiation of the light source.

2. The leakage oil detection device according to claim 1, wherein
   light of the light source includes both ultraviolet light and visible light,
   a filter that transmits the ultraviolet light and the visible light is mounted in front of the light source, and
   a filter that transmits visible light is mounted in front of the imaging device.

3. A leakage oil detection device configured to detect leakage oil in an oil filled apparatus, the leakage oil detection device comprising:
   a light source configured to irradiate the oil filled apparatus with light;
   an imaging device configured to capture an image of the oil filled apparatus;
   a control device configured to control operations of the light source and the imaging device;
   a storage device configured to store a captured image;
   an image processing device configured to process the stored image;
   a display device configured to display a processing result, wherein
   the light source and the imaging device are arranged in a manner of being capable of capturing specular reflection light from a surface of the oil filled apparatus as a target object, and
   the image processing device recognizes a bright portion in luminance as a leakage oil adhesion portion when the bright portion is observed inside a dark portion of the captured image at an end portion of the image, and extracts only a leakage oil site by machine learning method with respect to the observed three-layer structure of luminance, and the display device displays by adding a marker to an original image or the same image obtained without irradiation of the light source.

4. A leakage oil detection method for detecting leakage oil of an oil filled apparatus by using an image obtained by irradiating the oil filled apparatus with light and capturing an image of the oil filled apparatus, the leakage oil detection method comprising:

recognizing a brightest portion and a dark portion adjacent to the brightest portion on the captured image as leakage oil adhesion portions when a three-layer structure of luminance having bright portions having different luminances and a dark portion is observed in the image, extracting only a leakage oil site by machine learning method with respect to the observed three-layer structure of luminance, and adding a marker to an original image or the same image obtained without irradiation of the light source.

5. A leakage oil detection method according to claim 4, the leakage oil detection method comprising:

recognizing a bright portion in luminance, being different than the brightest portion, as a leakage oil adhesion portion when the bright portion is observed inside a dark portion of the captured image at an end portion of the image.

* * * * *